(12) United States Patent
Wang

(10) Patent No.: US 12,305,727 B2
(45) Date of Patent: May 20, 2025

(54) VENTILATED BRAKE DISC

(71) Applicant: CCYS HI-TECH INTERNATIONAL LTD., Taichung (TW)

(72) Inventor: Sheng-Yu Wang, Taichung (TW)

(73) Assignee: CCYS HI-TECH INTERNATIONAL LTD., Taichung (TW)

( * ) Notice: Subject to any disclaimer, the term of this patent is extended or adjusted under 35 U.S.C. 154(b) by 371 days.

(21) Appl. No.: 17/961,965

(22) Filed: Oct. 7, 2022

(65) Prior Publication Data

US 2023/0323928 A1    Oct. 12, 2023

(30) Foreign Application Priority Data

Apr. 8, 2022   (TW) .................................. 111203529

(51) Int. Cl.
| | |
|---|---|
| *F16D 65/12* | (2006.01) |
| *F16D 65/847* | (2006.01) |
| F16D 65/02 | (2006.01) |
| F16D 65/78 | (2006.01) |

(52) U.S. Cl.
CPC .......... *F16D 65/128* (2013.01); *F16D 65/847* (2013.01); *F16D 2065/1328* (2013.01); *F16D 2065/788* (2013.01)

(58) Field of Classification Search
CPC .. F16D 65/128; F16D 65/847; F16D 2065/78; F16D 2065/1328
USPC .......................... 188/218 XL, 264 A, 264 AA
See application file for complete search history.

(56) References Cited

U.S. PATENT DOCUMENTS

| | | | | |
|---|---|---|---|---|
| 4,164,993 A | * | 8/1979 | Kobelt | F16D 65/128 188/218 XL |
| 5,427,212 A | * | 6/1995 | Shimazu | B60T 5/00 188/71.6 |
| 5,526,905 A | * | 6/1996 | Shimazu | B60T 5/00 188/218 XL |
| 7,281,613 B2 | * | 10/2007 | Weiss | F16D 65/12 188/264 A |
| 11,384,806 B2 | * | 7/2022 | Rodriguez | F16D 65/128 |
| 2009/0057077 A1 | * | 3/2009 | Mears | F16D 65/128 188/218 XL |
| 2010/0206675 A1 | * | 8/2010 | Miyake | F16D 65/12 188/218 XL |

FOREIGN PATENT DOCUMENTS

TW       I732669 B       7/2021

* cited by examiner

*Primary Examiner* — Christopher P Schwartz
(74) *Attorney, Agent, or Firm* — Birch, Stewart, Kolasch & Birch, LLP

(57) ABSTRACT

A ventilated brake disc includes first and second plates, and a plurality of connecting ribs and protruding ribs. The first and second plates are each shaped as a circular ring, and each have inner and outer surfaces. The inner surfaces of the first and second plates face each other. The first and second plates collectively form a central via and an outer periphery of the ventilated brake disc. Each connecting rib is integrally connected to the inner surfaces of the first and second plates, and elongated in shape, thereby defined with two opposite ends, which are oriented toward the central via and the outer periphery respectively. Each protruding rib protrudes integrally from the inner surface of the first or second plate, and is not connected to the other plate and located between two connecting ribs. The present invention simultaneously attains lightweight and great structural strength and heat dissipating effect.

17 Claims, 8 Drawing Sheets

VENTILATED BRAKE DISC

BACKGROUND OF THE INVENTION

1. Field of the Invention

The present invention relates generally to brake discs and more particularly, to a ventilated brake disc.

2. Description of the Related Art

In the conventional disc brake system, two brake pads of a caliper, which are commonly referred to as linings, are primarily adopted to clamp a brake disc fixed to the wheel to attain braking effect on the wheels. Referring to Taiwan Patent No. 1732669, the conventional brake disc is made of metal by casting and thereby formed integrally. The appearance thereof is approximately shaped as a circular ring, thereby having a central through hole and an outer periphery. The currently common brake discs are usually not solid circular ring plates, but including two plates shaped as circular rings and a plurality of ribs located between the two plates so as to attain the objective of lightweight. One of the plates of the brake disc has a plurality of fastening holes arranged around the central through hole for being fastened to the wheel. Each of the ribs is integrally connected to both the two plates, and the positions of the ribs are arranged in a way that the brake disc is formed with a plurality of passageways extending from the central through hole to the outer periphery for guiding air to flow from the inside to the outside during the rotation of the wheel, thereby attaining heat dissipating effect.

In other words, the rib design of the brake disc needs to simultaneously attain lightweight and great structural strength and heat dissipating effect, but the conventional brake discs still need improvement in this aspect.

SUMMARY OF THE INVENTION

The present invention has been accomplished in view of the above-noted circumstances. It is a primary objective of the present invention to provide a ventilated brake disc, which can simultaneously attain lightweight and great structural strength and heat dissipating effect.

To attain the above objective, the present invention provides a ventilated brake disc which includes a first plate, a second plate, a plurality of connecting ribs, and a plurality of protruding ribs. The first plate and the second plate are each shaped as a circular ring, and each have an inner surface and an outer surface. The inner surface of the first plate and the inner surface of the second plate face each other. The first plate and the second plate collectively form a central through hole and an outer periphery of the ventilated brake disc. Each connecting rib is integrally connected to the inner surface of the first plate and the inner surface of the second plate. Each connecting rib is elongated in shape and thereby defined with two ends opposite to each other. The two ends are oriented toward the central through hole and the outer periphery respectively. Each protruding rib integrally protrudes from the inner surface of one of the first and second plates, and is not connected to the other of the first and second plates. Each protruding rib is located between two connecting ribs.

As a result, the connecting ribs and protruding ribs in the present invention form a plurality of passageways between the first plate and the second plate for air to flow therein, which can attain the objectives of lightweight and heat dissipation. Each connecting rib is connected to the first plate and the second plate, which can bring the ventilated brake disc great structural strength. Although each protruding rib is connected to only the first plate or the second plate, it can still slightly raise the structural strength of the ventilated brake disc and can divide the passageway formed between the adjacent connecting ribs into a plurality of relatively smaller passageways so as to guide the air to flow toward a plurality of directions and even bring turbulent flow effect, thereby further improving the heat dissipating effect of the ventilated brake disc.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
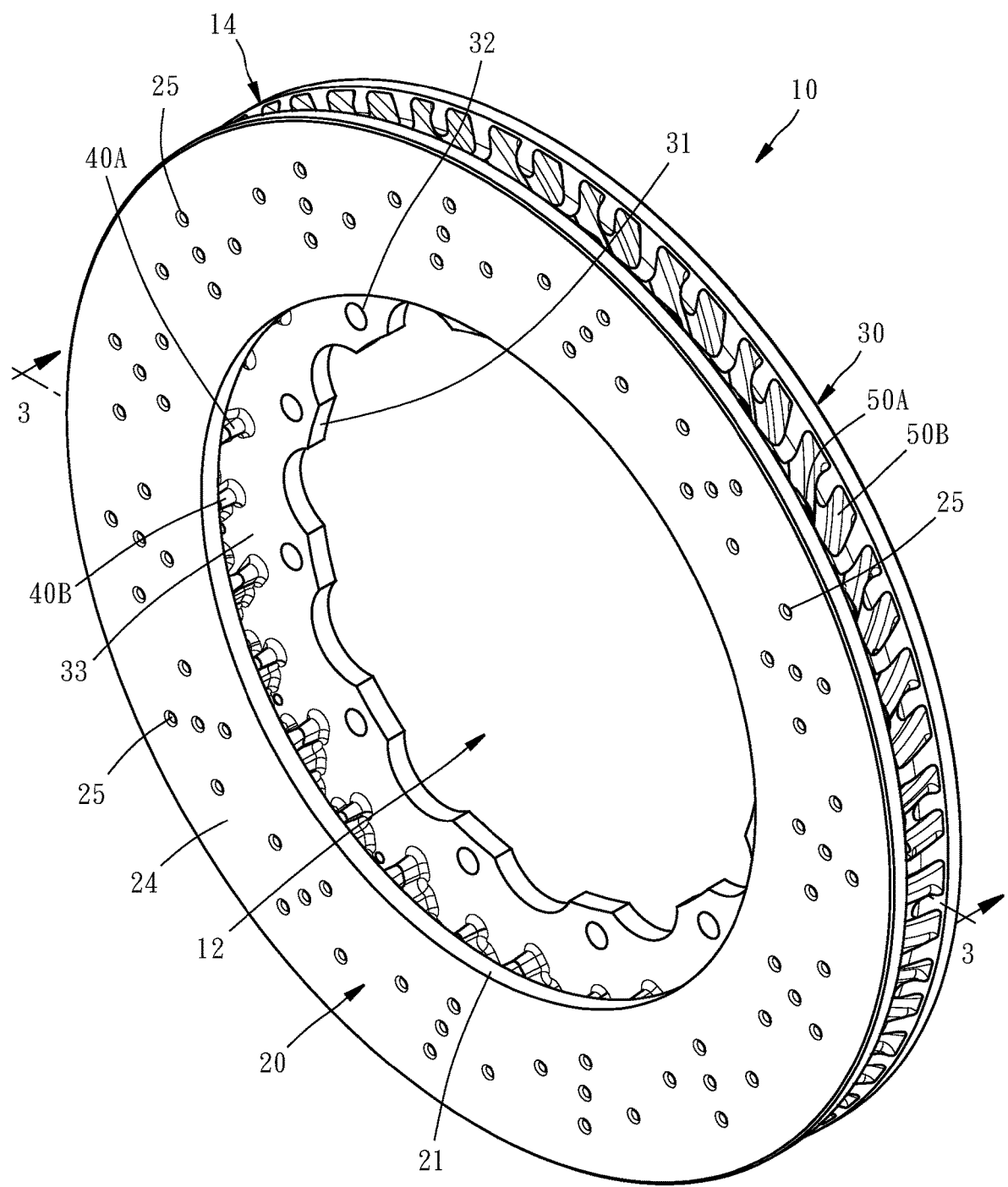
FIG. 1 is a perspective view of a ventilated brake disc according to a preferred embodiment of the present invention.

First of all, it is to be mentioned that same or similar reference numerals used in the following embodiment and the appendix drawings designate same or similar elements or the structural features thereof throughout the specification for the purpose of concise illustration of the present invention.

Referring to FIG. 1 to FIG. 4, a ventilated brake disc 10 according to a preferred embodiment of the present invention is made of metal by casting and thereby formed integrally. The structure thereof primarily includes a first plate 20, a second plate 30, and a plurality of connecting ribs 40A and 40B and a plurality of protruding ribs 50A and 50B, which are located between the first and second plates 20 and 30.

The first and second plates 20 and 30 are both shaped as a circular ring and their outer diameters are equal. The difference therebetween lies in that the inner periphery 21 of the first plate 20 is circular, but the inner periphery 31 of the second plate 30 has concave and convex shapes. Besides, the second plate 30 is provided adjacent to the inner periphery 31 thereof with a plurality of fastening holes 32. The fastening holes 32 are adapted for fastening members, such as bolts (not shown), to be inserted therethrough so as to fasten the ventilated brake disc 10 to a wheel (not shown). Each of the first and second plates 20 and 30 has an inner surface 23 or 33 and an outer surface 24 or 34. The inner surface 23 of the first plate 20 and the inner surface 33 of the second plate 30 face each other, and are integrally connected by the connecting ribs 40A and 40B. The inner peripheries of the first and second plates 20 and 30 collectively form a central through hole 12 of the ventilated brake disc 10. The outer peripheries of the first and second plates 20 and 30 collectively form an outer periphery 14 of the ventilated brake disc 10.

Figure 2:
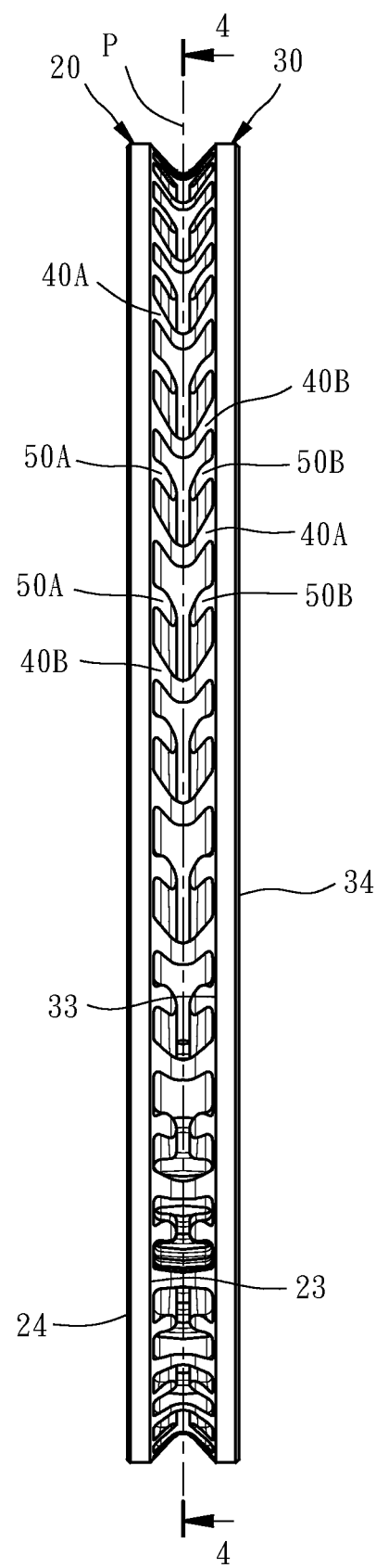
FIG. 2 is a lateral view of the ventilated brake disc.
Figure 3:
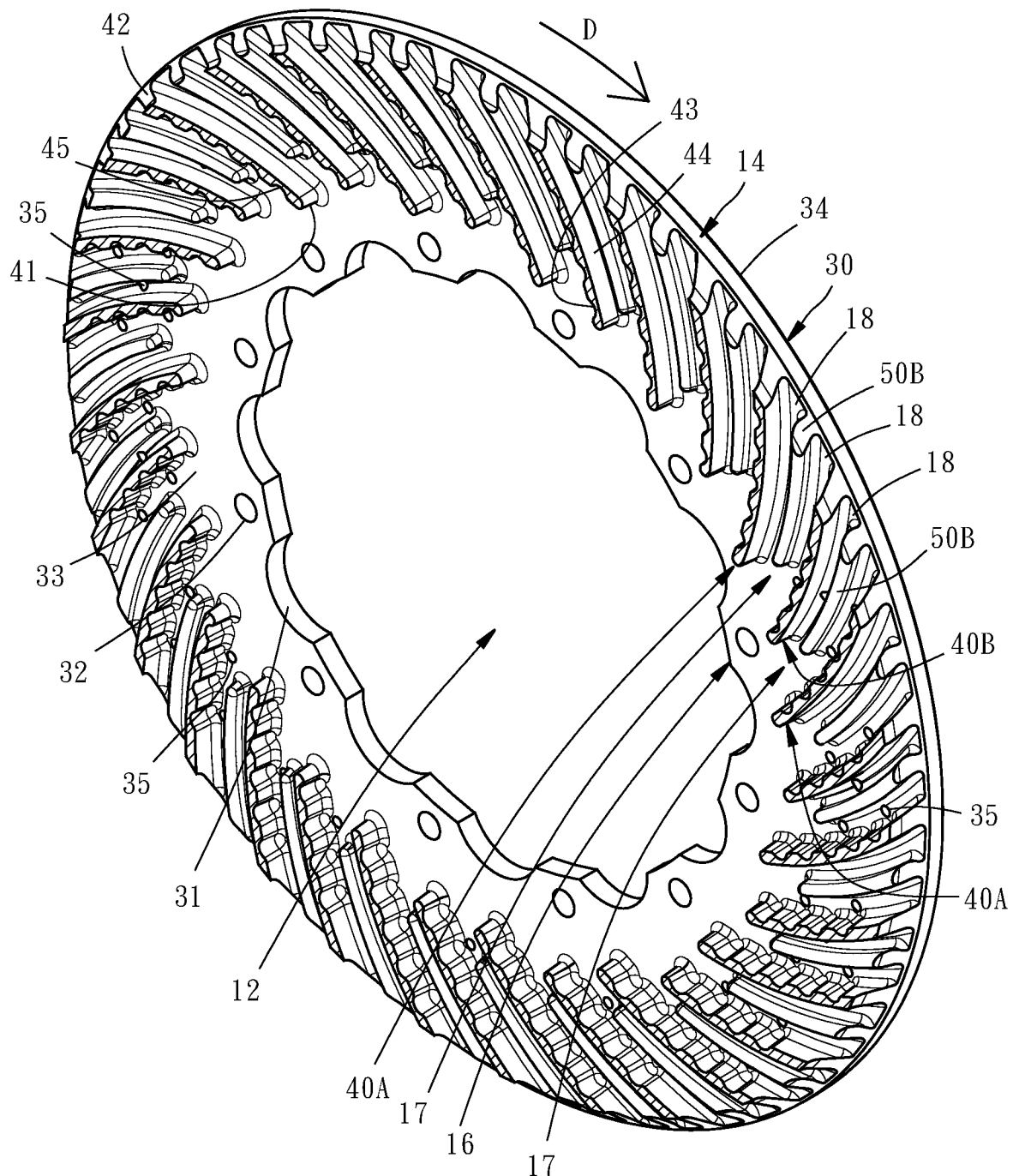
FIG. 3 is a perspective sectional view taken along the line 3-3 in FIG. 1.
Figure 4:
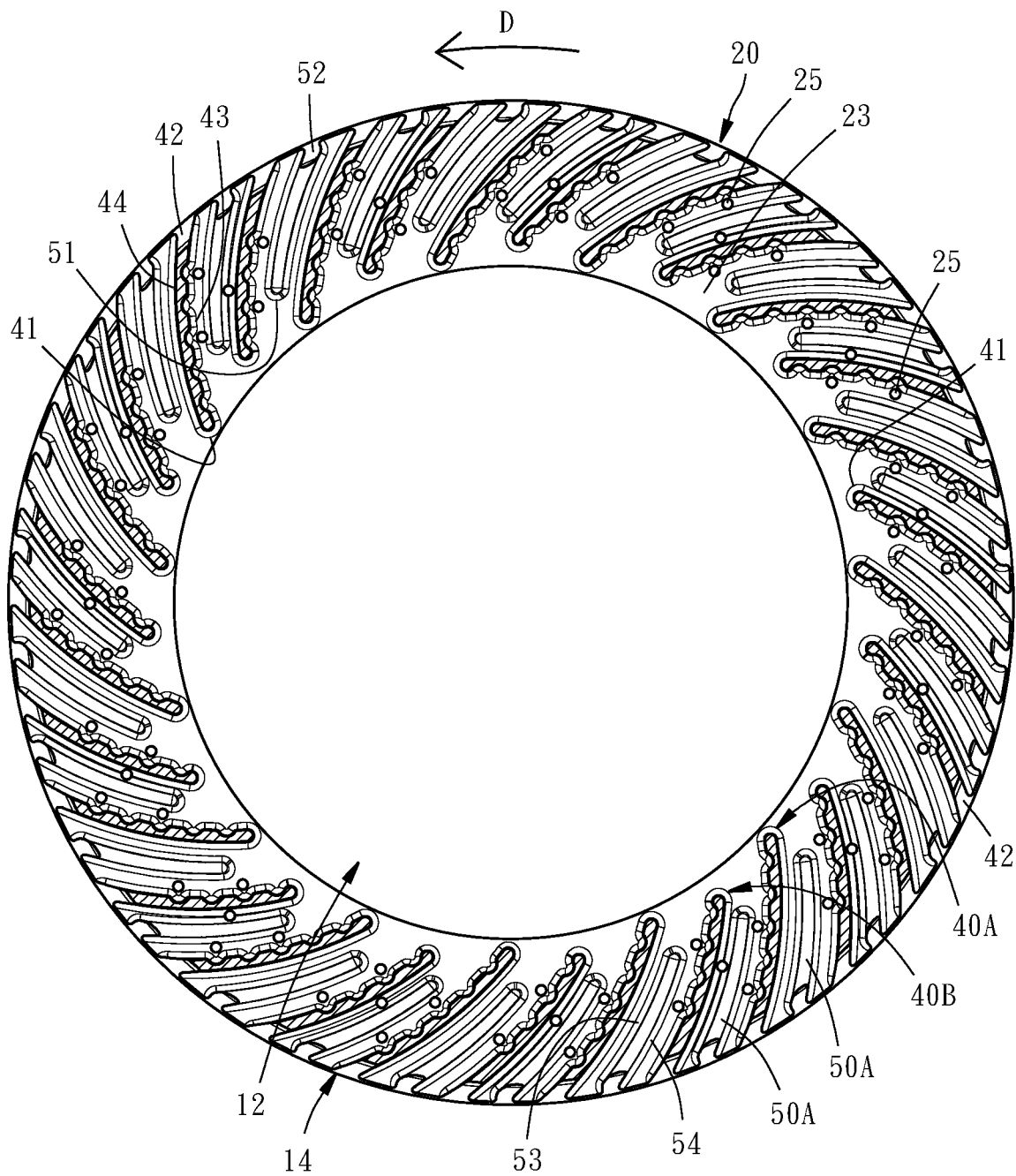
FIG. 4 is a sectional view taken along the line 4-4 in FIG. 2.

As shown in FIG. 3 and FIG. 4, each of the connecting ribs 40A and 40B and protruding ribs 50A and 50B extends inclinedly relative to the radial direction of the ventilated brake disc 10 in a slightly arc manner into an elongated shape. Two ends of each of the connecting ribs 40A and 40B and protruding ribs 50A and 50B, i.e. inner end 41 or 51 and outer end 42 or 52, are oriented toward the central through hole 12 and the outer periphery 14 respectively. However, the connecting ribs 40A and 40B and the protruding ribs 50A and 50B are primarily different in that each of the connecting ribs 40A and 40B is integrally connected to the inner surface 23 of the first plate 20 and the inner surface 33 of the second plate 30, but each of the protruding ribs 50A and 50B is integrally connected to only the inner surface 23 of the first plate 20 or the inner surface 33 of the second plate 30. Each of the protruding ribs 50A and 50B is located between two connecting ribs 40A and 40B. In this embodiment, every two adjacent connecting ribs 40A and 40B are provided therebetween with only a protruding rib 50A and a protruding rib 50B. The protruding rib 50A protrudes from the inner surface 23 of the first plate 20, and is not connected to the second plate 30. The protruding rib 50B protrudes from the inner surface 33 of the second plate 30, corresponds in location to the protruding rib 50A, and is not connected to the first plate 20. That is, the protruding rib 50A and the protruding rib 50B face to each other. Specifically, the ventilated brake disc 10 is defined with an imaginary central reference surface P located between the first and second plates 20 and 30, as shown in FIG. 2. The two protruding ribs 50A and 50B provided between every two adjacent connecting ribs 40A and 40B are shaped symmetrically with respect to the imaginary central reference surface P. Besides, each of the connecting ribs 40A and 40B is also shaped symmetrically with respect to the imaginary central reference surface P. Such symmetric arrangement can balance the weight distribution of the ventilated brake disc 10. However, the present invention is unlimited to such arrangement. For example, every two adjacent connecting ribs 40A and 40B may be provided therebetween with only a protruding rib, or may be provided therebetween with more than two protruding ribs.

Further speaking, the ventilated brake disc 10 is defined with a rotational direction D, i.e., the rotational direction of the wheel when the car goes forward. Each of the connecting ribs 40A and 40B and protruding ribs 50A and 50B inclinedly extends in an arc manner from the outer periphery 14 toward the central through hole 12 in a way of deflecting toward the rotational direction D. In FIG. 4, the rotational direction D is the counterclockwise direction. Each of the connecting ribs 40A and 40B and protruding ribs 50A is inclined in a way of deflecting toward the counterclockwise direction from the outer periphery 14 toward the central through hole 12, and also slightly bended into an arc in a way of deflecting toward the counterclockwise direction from the outer periphery 14 toward the central through hole 12. Each of the protruding ribs 50A and 50B extends from the outer periphery 14 for a length shorter than each of the connecting ribs 40A and 40B, so the inner end 41 of each of the connecting ribs 40A and 40B is closer to the central through hole 12 than the inner end 51 of each of the protruding ribs 50A and 50B is. Besides, the connecting ribs 40A and 40B include a plurality of long connecting ribs 40A and a plurality of short connecting ribs 40B. Each short connecting rib 40B extends from the outer periphery 14 for a length shorter than each long connecting rib 40A, so the inner end 41 of each long connecting rib 40A is closer to the central through hole 12 than the inner end 41 of each short connecting rib 40B is. The long connecting ribs 40A and short connecting ribs 40B are arranged in a staggered manner, which means every two adjacent long connecting ribs 40A are provided therebetween with a short connecting rib 40B and every two adjacent short connecting ribs 40B are provided therebetween with a long connecting rib 40A.

Figure 5:
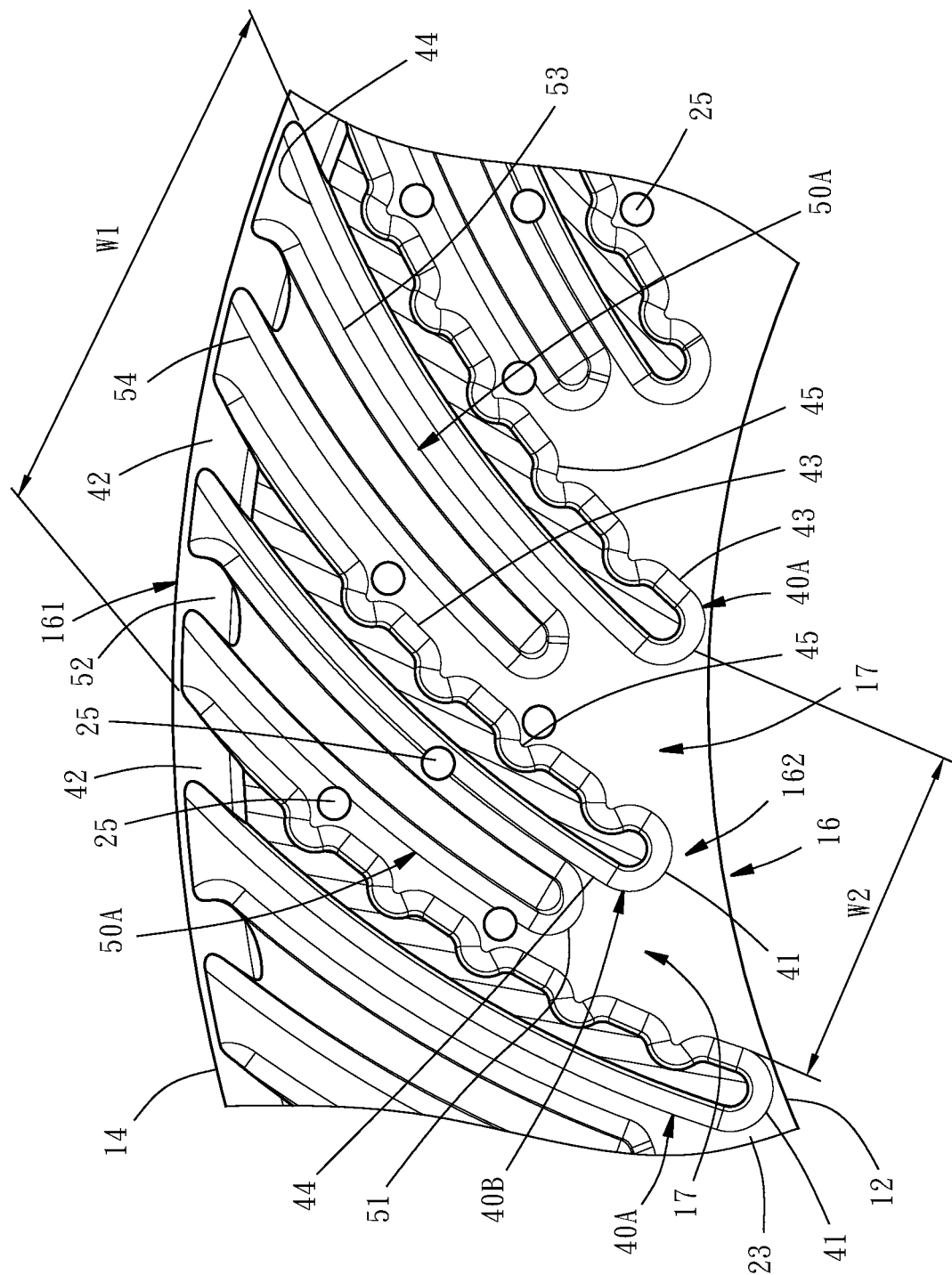
FIG. 5 is a partial enlarged view of FIG. 4.
Figure 6:
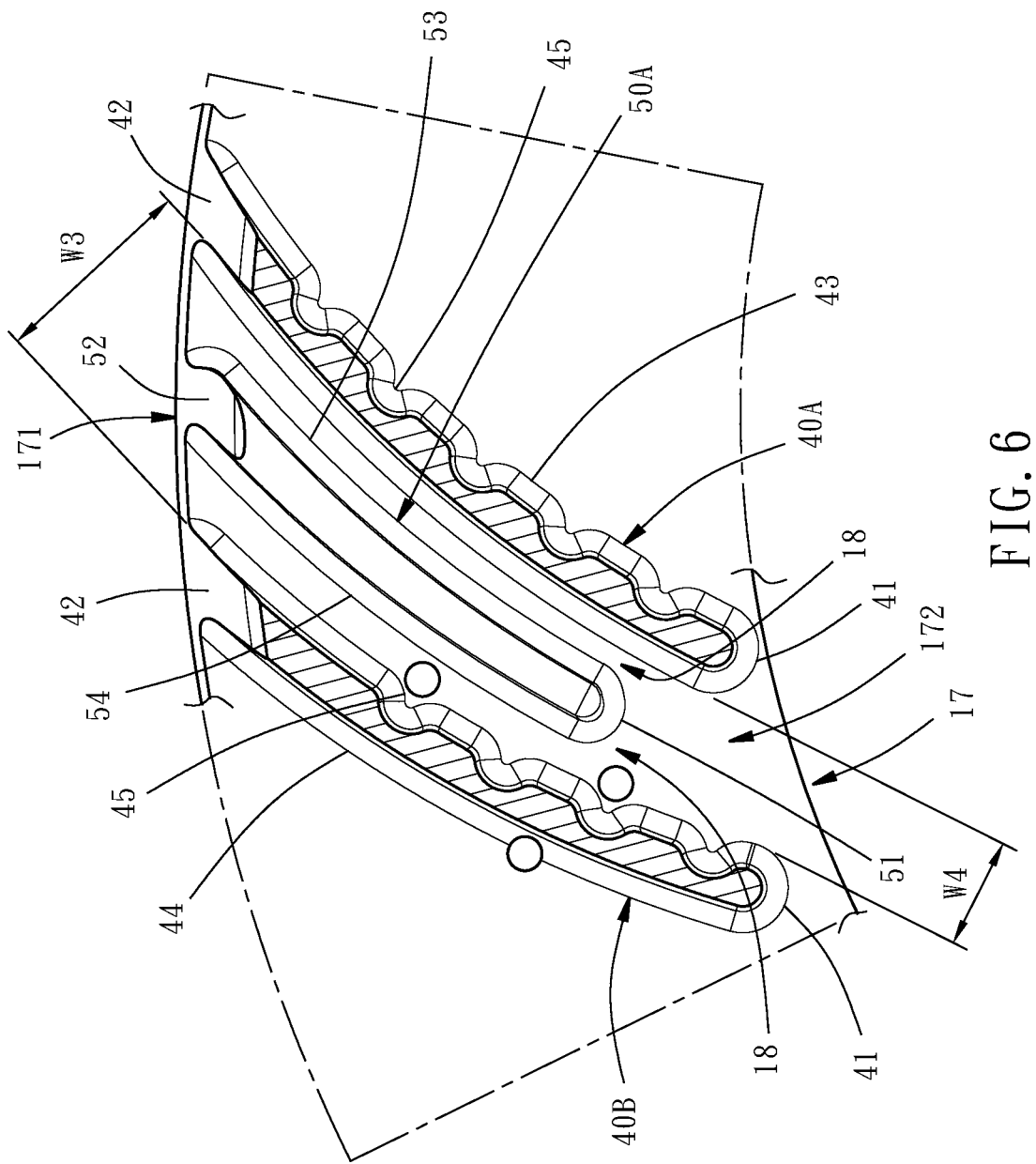
FIG. 6 is a partial enlarged view of FIG. 5.
Figure 7:
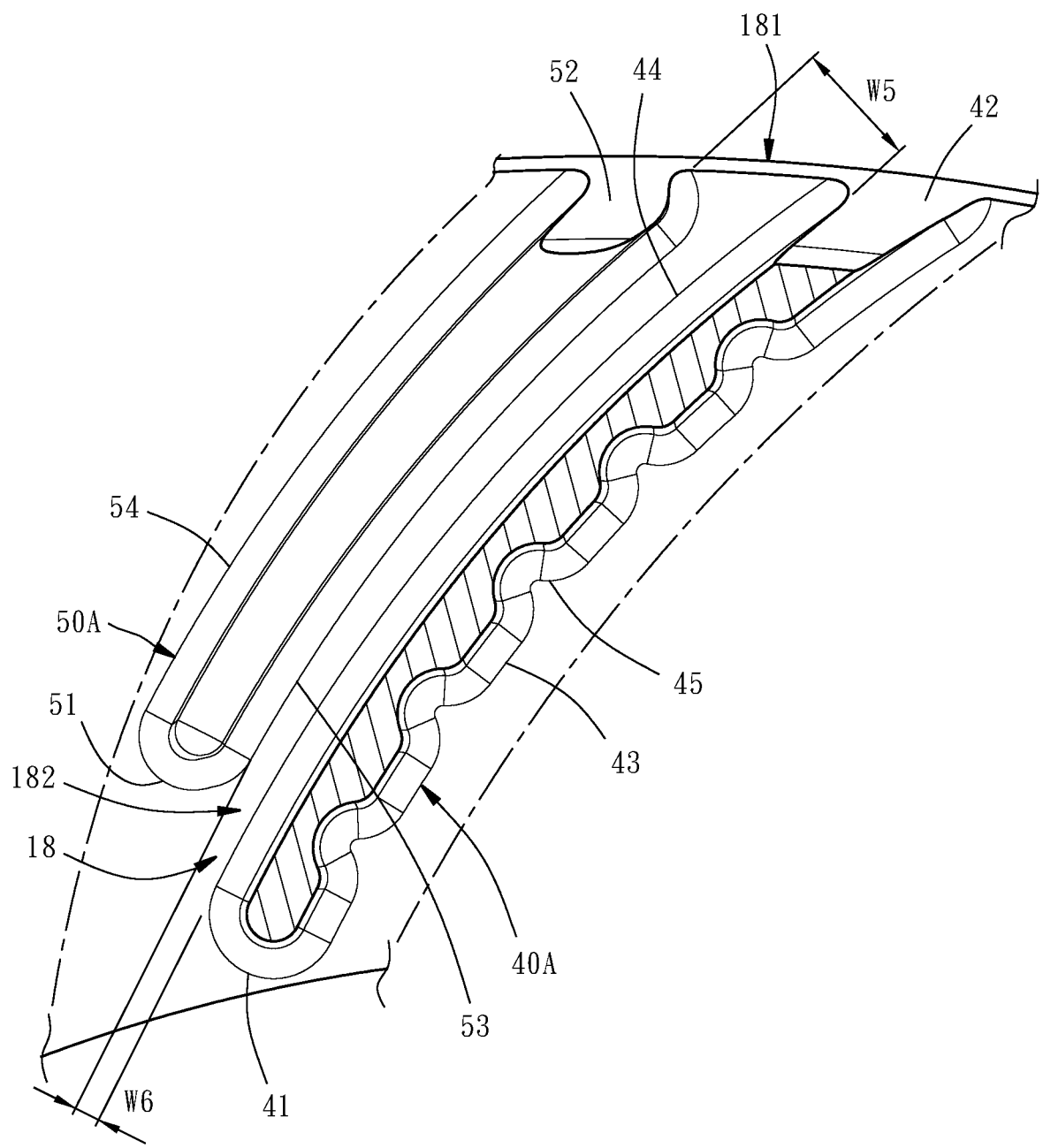
FIG. 7 is a partial enlarged view of FIG. 6.

Referring to FIG. 5, every two adjacent long connecting ribs 40A form a passageway 16 therebetween, which is also referred to as large passageway in the present invention. Each large passageway 16 has an outer end 161 oriented toward the outer periphery 14 and an inner end 162 oriented toward the central through hole 12. The width W1 of the outer end 161 is larger than the width W2 of the inner end 162. Each large passageway 16 is provided therein with a short connecting rib 40B, two protruding ribs 50A and two protruding ribs 50B, wherein the protruding ribs 50B are not shown in FIG. 5. Each large passageway 16 includes two passageways 17 divided by the short connecting rib 40B located therein and also referred to as medium passageways in the present invention. That means each medium passageway 17 is formed between the adjacent long connecting rib 40A and short connecting rib 40B. Referring to FIG. 6, each medium passageway 17 has an outer end 171 oriented toward the outer periphery 14 and an inner end 172 oriented toward the central through hole 12. The width W3 of the outer end 171 is larger than the width W4 of the inner end 172. Each medium passageway 17 is provided therein with a protruding rib 50A and a protruding rib 50B spacedly facing the protruding rib 50A, wherein the protruding rib 50B is not shown in FIG. 6. Each medium passageway 17 includes four passageways 18 divided by the protruding ribs 50A and 50B located therein and also referred to as small passageways in the present invention, including two small passageways 18 located adjacent to the first plate 20 and divided by the protruding rib 50A and two small passageways 18 located adjacent to the second plate 30 and divided by the protruding rib 50B. That means each small passageway 18 is formed between the adjacent connecting rib 40A or 40B and protruding rib 50A or 50B. Referring to FIG. 7, each small passageway 18 has an outer end 181 oriented toward the outer periphery 14 and an inner end 182 oriented toward the central through hole 12. The width W5 of the outer end 181 is larger than the width W6 of the inner end 182.

It can be known from the above description that the present invention uses the protruding ribs 50A and 50B provided between the connecting ribs 40A and 40B to divide each passageway formed between the connecting ribs 40A and 40B into a plurality of relatively smaller passageways. In this embodiment, every two adjacent long connecting rib 40A and short connecting rib 40B are provided therebetween with two protruding ribs 50A and 50B, resulting in four small passageways 18 divided thereby, and the two protruding ribs 50A and 50B also form another passageway therebetween. In this way, during the rotation of the wheel, an air flow is produced from the central through hole 12 to the outer periphery 14. After the air flow enters each large passageway 16 from the central through hole 12, a part of it will directly enter the medium passageways 17, and another part of it will firstly collide with the short connecting ribs 40B and thereby turn into the medium passageways 17. After the air flow enters each medium passageway 17, a part of it will directly enter the small passageways 18, another part of it will directly enter the passageways between the protruding ribs 50A and 50B, and still another part of it will firstly collide with the protruding ribs 50A and 50B and thereby turn into the small passageways 18 or the passageways between the protruding ribs 50A and 50B. After the above-described air flow passes through each passageway, it will be vented through the outer periphery 14 of the ventilated brake disc 10.

As a result, because of having the connecting ribs 40A and 40B and protruding ribs 50A and 50B, the ventilated brake disc 10 of the present invention is formed therein with hollow passageways, thereby attaining the objectives of lightweight and heat dissipation. The first and second plates 20 and 30 are firmly connected by the connecting ribs 40A and 40B, so that the ventilated brake disc 10 has great structural strength. Although each of the protruding ribs 50A and 50B is connected to only the first plate 20 or the second plate 30, it can still slightly raise the structural strength of the ventilated brake disc 10. Besides, as described above, the connecting ribs 40A and 40B and protruding ribs 50A and 50B can make the air flow turn, thereby guiding the air flow toward a plurality of directions into a plurality of passageways and then vented through the outer periphery 14. Such manner can increase the area of the ventilated brake disc 10 in contact with the air flow and thereby benefit the heat dissipation, and can even bring turbulent flow effect to further improve the heat dissipating effect of the ventilated brake disc 10. Besides, the above-described feature of narrow inner end and wide outer end of each passageway 16, 17 or 18 facilitates the air flow to flow from the inside to the outside, thereby further improving the heat dissipating effect of the ventilated brake disc 10.

Except for the above-described features, each of the connecting ribs 40A and 40B and protruding ribs 50A and 50B in this embodiment has an inside surface 43 or 53 inclinedly facing toward the central through hole 12, which means it is not right aimed at the central through hole 12, and an outside surface 44 or 54 inclinedly facing toward the outer periphery 14, which means it is not right aimed at the outer periphery 14. The inside surface 43 of each long connecting rib 40A has five indentations 45. The inside surface 43 of each short connecting rib 40B has four indentations 45. The indentations 45 can increase the area of the ventilated brake disc 10 in contact with the air flow and thereby benefit the heat dissipation. Besides, the collision between the air flow and the indentations 45 can also bring the turbulent flow effect and thereby further improve the heat dissipating effect of the ventilated brake disc 10. In addition, in this embodiment, the first plate 20 further has a plurality of through holes 25 penetrating through the inner and outer surfaces 23 and 24 thereof, and the second plate 30 also has a plurality of through holes 35 penetrating through the inner and outer surfaces 33 and 34 thereof. The through holes 25 of the first plate 20 are located correspondingly to the through holes 35 of the second plate 30 respectively. As a result, the through holes 25 and 35 of the first and second plates 20 and 30 are also adapted for venting the air to attain heat dissipating effect. Besides, a part of the through holes 25 and 35 are located correspondingly to the indentations 45 of the connecting ribs 40A and 40B. Specifically speaking, in this embodiment, two indentations 45 of each of the connecting ribs 40A and 40B are each located correspondingly to a through hole 25 and a through hole 35. Besides, the outside surface 44 of each short connecting rib 40B and the inside surfaces 53 of the protruding ribs 50A and 50B located adjacent thereto are provided therebetween with a through hole 25 and a through hole 35 respectively. These two through holes 25 and 35 are located non-correspondingly to the indentation 45. From this it can be known that the through hole 25 or 35 may be located correspondingly to the indentation 45 or non-correspondingly to the indentation 45, which can be modified according to the structural demands. The turbulent flow effect caused by the indentations 45 to the air flow can facilitate the air to be vented through the through holes 25 and 35 located correspondingly to the indentations 45.

Figure 8:
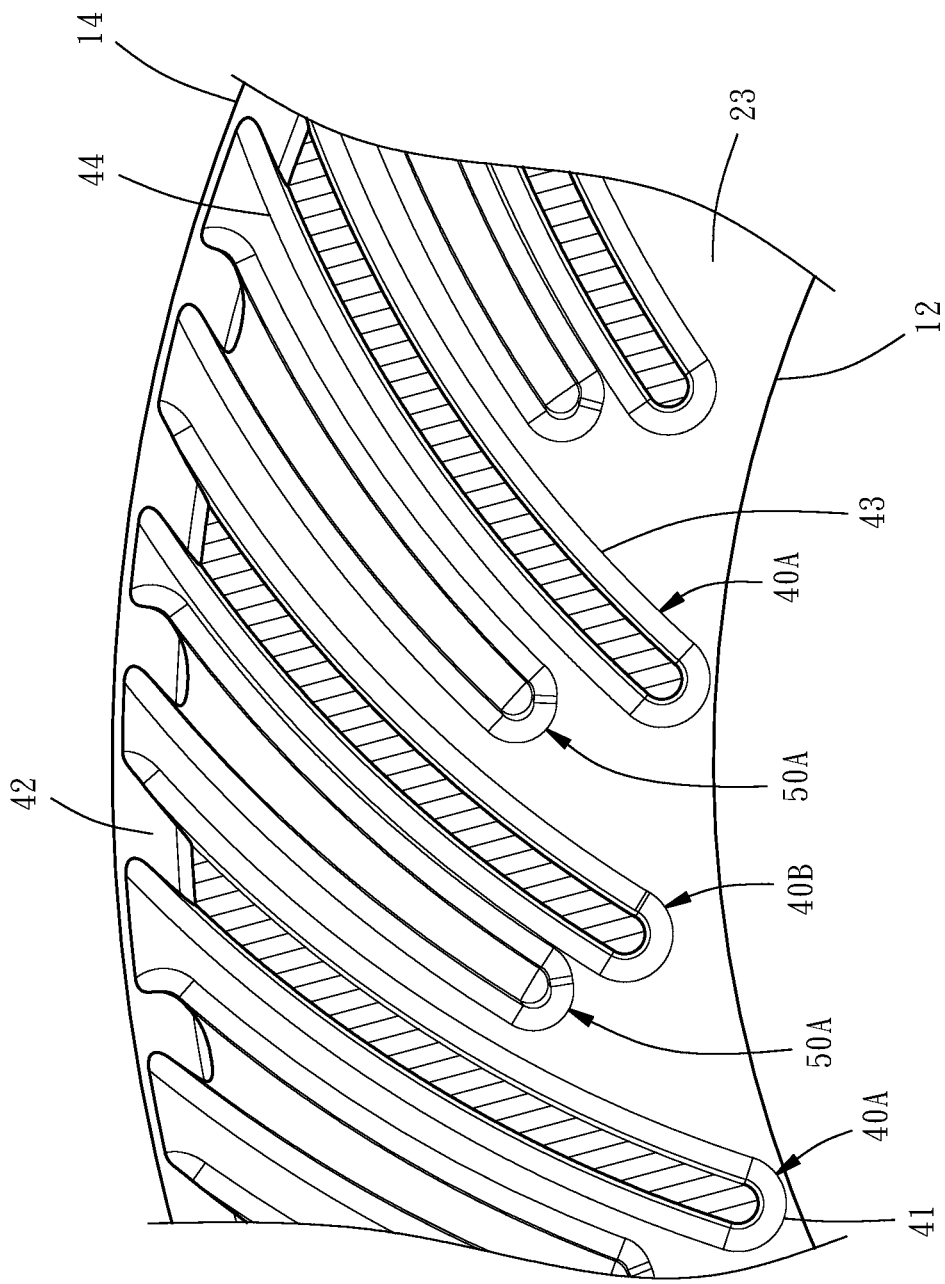
FIG. 8 is similar to FIG. 5, but showing the configuration of the ventilated brake disc without through hole and indentation.

However, as shown in FIG. 8, the ventilated brake disc 10 of the present invention may have no such indentation 45 or through hole 25 or 35 as described above. By the connecting ribs 40A and 40B and protruding ribs 50A and 50B, the lightweight and great structural strength and heat dissipating effect can be simultaneously attained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A ventilated brake disc comprising:
a first plate and a second plate each shaped as a circular ring and each having an inner surface and an outer surface, the inner surface of the first plate and the inner surface of the second plate facing each other, the first plate and the second plate collectively forming a central through hole and an outer periphery of the ventilated brake disc;
a plurality of connecting ribs, each of the connecting ribs being integrally connected to the inner surface of the first plate and the inner surface of the second plate, each of the connecting ribs being elongated in shape and thereby defined with two ends opposite to each other, the two ends being oriented toward the central through hole and the outer periphery respectively; and
a plurality of protruding ribs, each of the protruding ribs integrally protruding from the inner surface of one of the first plate and the second plate and being not connected to the other of the first plate and the second plate, each of the protruding ribs being located between two said connecting ribs,
wherein each of the connecting ribs and the protruding ribs inclinedly extends from the outer periphery toward the central through hole, and
wherein each of the connecting ribs and the protruding ribs has an inside surface inclinedly facing toward the central through hole, and an outside surface inclinedly facing toward the outer periphery; the inside surface of each of the connecting ribs has a plurality of indentations.

2. The ventilated brake disc as claimed in claim 1, wherein every two adjacent said connecting ribs are provided therebetween with only two said protruding ribs, one of which protrudes from the inner surface of the first plate and is not connected to the second plate, and the other protrudes from the inner surface of the second plate and is not connected to the first plate.

3. The ventilated brake disc as claimed in claim 2, wherein the ventilated brake disc is defined with an imaginary central reference surface located between the first plate and the second plate; the two protruding ribs provided between every two adjacent said connecting ribs are shaped symmetrically with respect to the imaginary central reference surface.

4. The ventilated brake disc as claimed in claim 1, wherein each of the protruding ribs is elongated in shape and shorter than each of the connecting ribs, thereby defined with two ends opposite to each other; the two ends of each of the protruding ribs are oriented toward the central through hole and the outer periphery respectively.

5. The ventilated brake disc as claimed in claim 4, wherein each of the connecting ribs is closer to the central through hole than each of the protruding ribs is.

6. The ventilated brake disc as claimed in claim 5, wherein the connecting ribs comprise a plurality of long connecting ribs, and a plurality of short connecting ribs shorter than each of the long connecting ribs; the long connecting ribs and the short connecting ribs are arranged in a staggered manner; each of the connecting ribs and the protruding ribs extends in an arc manner from the outer periphery toward the central through hole; each of the first plate and the second plate has a plurality of through holes penetrating through the inner surface and the outer surface thereof, at least a part of the through holes are located correspondingly to the indentations of the connecting ribs; two said indentations of each of the connecting ribs are each located correspondingly to at least one said through hole; the outside surface of each of the short connecting ribs and the inside surface of the protruding rib located adjacent thereto are provided therebetween with one of said through holes; the through holes of the first plate are located correspondingly to the through holes of the second plate respectively; every two adjacent said long connecting ribs form a large passageway therebetween; each of the large passageways has an outer end oriented toward the outer periphery and an inner end oriented toward the central through hole; for each of the large passageways, a width of the outer end is larger than a width of the inner end; each of the large passageways is provided therein with one of said short connecting ribs; each of the large passageways comprises two medium passageways divided by the short connecting rib located therein; each of the medium passageways has an outer end oriented toward the outer periphery and an inner end oriented toward the central through hole; for each of the medium passageways, a width of the outer end is larger than a width of the inner end; each of the medium passageways is provided therein with at least one of said protruding ribs; each of the medium passageways comprises at least two small passageways divided by the protruding rib located therein; each of the small passageways has an outer end oriented toward the outer periphery and an inner end oriented toward the central through hole; for each of the small passageways, a width of the outer end is larger than a width of the inner end.

7. The ventilated brake disc as claimed in claim 1, wherein the connecting ribs comprise a plurality of long connecting ribs and a plurality of short connecting ribs shorter than each of the long connecting ribs; the long connecting ribs and the short connecting ribs are arranged in a staggered manner.

8. The ventilated brake disc as claimed in claim 7, wherein each of the long connecting ribs is closer to the central through hole than each of the short connecting ribs is.

9. The ventilated brake disc as claimed in claim 7, wherein every two adjacent said long connecting ribs form a passageway therebetween; each of the passageways has an outer end oriented toward the outer periphery and an inner end oriented toward the central through hole; a width of the outer end is larger than a width of the inner end.

10. The ventilated brake disc as claimed in claim 7, wherein the adjacent long connecting rib and short connecting rib form a passageway therebetween; each of the passageways has an outer end oriented toward the outer periphery and an inner end oriented toward the central through hole; a width of the outer end is larger than a width of the inner end.

11. The ventilated brake disc as claimed in claim 1, wherein at least one of the first plate and the second plate has a plurality of through holes penetrating through the inner surface and the outer surface thereof; at least a part of the through holes are located correspondingly to the indentations of the connecting ribs.

12. The ventilated brake disc as claimed in claim 11, wherein two of said indentations of each of the connecting ribs are each located correspondingly to at least one of said through holes.

13. The ventilated brake disc as claimed in claim 11, wherein the connecting ribs comprise a plurality of long connecting ribs, and a plurality of short connecting ribs shorter than each of the long connecting ribs; the long connecting ribs and the short connecting ribs are arranged in a staggered manner; the outside surface of each of the short connecting ribs and the inside surface of the protruding rib located adjacent thereto are provided therebetween with one of said through holes.

14. The ventilated brake disc as claimed in claim 11, wherein the first plate and the second plate both have a plurality of said through holes; the through holes of the first plate are located correspondingly to the through holes of the second plate respectively.

15. The ventilated brake disc as claimed in claim 1, wherein each of the connecting ribs and the protruding ribs extends in an arc manner from the outer periphery toward the central through hole.

16. The ventilated brake disc as claimed in claim 1, wherein every two adjacent said connecting ribs form a passageway therebetween; each of the passageways has an outer end oriented toward the outer periphery and an inner end oriented toward the central through hole; a width of the outer end is larger than a width of the inner end.

17. The ventilated brake disc as claimed in claim 1, wherein the adjacent connecting rib and protruding rib form a passageway therebetween; each of the passageways has an outer end oriented toward the outer periphery and an inner end oriented toward the central through hole; a width of the outer end is larger than a width of the inner end.

* * * * *